United States Patent [19]

Spiro et al.

[11] Patent Number: 5,369,757
[45] Date of Patent: Nov. 29, 1994

[54] RECOVERY LOGGING IN THE PRESENCE OF SNAPSHOT FILES BY ORDERING OF BUFFER POOL FLUSHING

[75] Inventors: Peter M. Spiro; Ananth Raghavan; Tirumanjanam K. Rengarajan, all of Nashua, N.H.

[73] Assignee: Digital Equipment Corporation, Maynard, Mass.

[21] Appl. No.: 717,212

[22] Filed: Jun. 18, 1991

[51] Int. Cl.⁵ .............................................. G06F 11/34
[52] U.S. Cl. ...................................... 395/575; 371/12
[58] Field of Search ............... 395/575, 600, 164, 425; 371/12, 13

[56] References Cited

U.S. PATENT DOCUMENTS

| | | | |
|---|---|---|---|
| 4,752,910 | 1/1988 | Yen et al. | 364/900 |
| 5,193,162 | 3/1993 | Bordsen et al. | 395/575 |
| 5,201,044 | 4/1993 | Frey, Jr. et al. | 395/575 |

OTHER PUBLICATIONS

Hobbs et al., *Rdb/VMS-A Comprehensive Guide*, Digital Press, Maynard, Mass. (1991).
"Improving Database Performance," pp. 16-92 of Rdb/VMS User Documentation, Digital Equipment Corp., Maynard, Mass.

*Primary Examiner*—Robert W. Beausoliel, Jr.
*Assistant Examiner*—T. Tu
*Attorney, Agent, or Firm*—Arnold, White & Durkee

[57] ABSTRACT

In a transaction processing system, snapshot records are stored in volatile memory along with volatile state memory records, and modifications to the volatile state memory records by the transactions are logged to an after-image log in non-volatile memory for recovery of the volatile state memory records. For recovery of the snapshot records in volatile memory, when any one of the records of volatile state memory are to be written from volatile memory to non-volatile state memory, the volatile snapshots records of the volatile state memory record are first written from volatile snapshot memory to non-volatile snapshot memory. This ordering of buffer pool flushing permits recovery of the volatile snapshot records from non-volatile state memory or from modifications in the after-image log. Moreover, recovery can be performed without writing modifications to the volatile snapshot records in an after-image log or flushing the snapshot records using an atomic operation.

15 Claims, 7 Drawing Sheets

RECOVERY LOGGING IN THE PRESENCE OF SNAPSHOT FILES BY ORDERING OF BUFFER POOL FLUSHING

BACKGROUND OF THE INVENTION

1. Field of the Invention

The present, invention relates generally to transaction processing, and more particularly to a transaction processing system in which transactions may reference old copies of the state memory of the system. Specifically, the present invention concerns a method of ensuring proper recovery in such a system when the results of each transaction are committed to an after-image log rather than being written into non-volatile state memory after each transaction.

2. Description of the Background Art

A desirable feature of a computing system is the ability to recover from partial system failures that may interrupt memory write operations. If an application program has a memory write operation in progress at the time of the system failure, it is possible that a memory record will become erroneous. To enable the recovery of memory records after a partial system failure, it is necessary for the application program to keep backup copies of the records in nonvolatile memory. When the computing system is restarted, the memory records to be recovered are replaced with the backup copies.

To facilitate the making of backup copies and the recovery of memory records, the operating system typically provides an established set of memory management procedures that can be invoked or called from an application program to define a "recovery unit." The recovery unit consists of program statements between a "START" statement and a "COMMIT" statement. All of the statements in the "recovery unit" must be completed before the memory records modified by the statements in the recovery unit are made available for subsequent processing. The statements in the "recovery unit" specify operations in a single "transaction." Upon recovering from a partial system failure, inspection of the nonvolatile memory will reveal that the operations in the single "transaction" are either all completed, or none of them are completed.

The operations in a single transaction may modify a number of files, and the files may be shared by other processes. During the transaction, the files may be inconsistent for a time, although the files will be consistent upon completion of the transaction. A typical example is a transfer of funds from one account to another, in which a first account is debited, and at a slightly later time, another account is credited. During the interim, the two accounts are inconsistent because the sum of the two accounts does not represent the total funds in the two accounts. Due to inconsistency when files are being modified by a transaction, it is known to prevent other processes from accessing the files until the modification is finished.

Transactions are typically distributed in transaction processing systems in such a way that the performance of a second transaction is begun before the results of a first transaction are committed. To ensure ease of recovery, the second transaction is usually precluded from reading any results of the first transaction before the first transaction commits. In a data base system, for example, a transaction places "write locks" on any data base records that are modified by the transaction. To ensure consistency of data read by a transaction, the transaction may also place "read locks" on any data base records that are read by the transaction.

The use of memory locks inhibits concurrency between transactions, which causes a decrease in transaction processing speed. In some systems, such as "Rdb/VMS" and "VAX DBMS" sold by Digital Equipment Corporation, a "snapshot" mechanism eliminates the need for read locks and also prevents blocking of read operations by write locks. The "snapshot" mechanism permits a transaction to obtain, at any time, a consistent version of data existing at the time that the transaction begins.

In the "Rdb/VMS" and "VAX DBMS" systems sold by Digital Equipment Corporation, recoverability is ensured by flushing to an "undo log" the "before-images" of records to be updated, and then flushing the updated data records to state memory just before a transaction is committed. If a crash occurs, the updated records are replaced with "before images" that are obtained from the "undo log" to "undo" the effects of the transaction.

The "Rdb/VMS" and "VAX DBMS" systems have an optional feature called "After Image Journaling" that provides a facility to "roll forward" updates on a database restored from a backup copy. The journaling mechanism saves copies of records after they have been modified, along with other information permitting reconstruction of the changes made to the database.

The "undo" recovery mechanism of "Rdb/VMS" and "VAX DBMS" provides very fast recovery because only the effects of failed transactions must be undone. A considerable amount of processing time, however, is spent flushing updated records to state memory when each transaction is committed. In a stable environment where systems crashes are very infrequent, fast recovery is not particularly important. For transactions that update the same records for multiple transactions, and transactions that are short and do not update many pages, a considerable amount of processing time is wasted by flushing updated records to state memory at the end of every transaction.

SUMMARY OF THE INVENTION

The present invention involves the use of a "redo" recovery mechanism that does not flush updated records to state memory after every transaction. Instead, updated records are written sequentially to an after-image log, and all of the updated records are flushed to state memory only when certain "checkpoints" occur. The checkpoints occur, for example, after a specified number of transactions, or after a predetermined number of bytes have been written to the after-image log after the last checkpoint. The "redo" recovery mechanism therefore allows updated, committed records to remain in volatile memory. When a system crash occurs, the volatile state memory existing at the end of the last committed transaction is reconstructed by reading from the non-volatile state memory the state memory records existing at the time of the last checkpoint, and re-doing the modifications recorded in the after-image log. The after-image log, for example, is read sequentially while re-doing the modifications.

The present invention more particularly concerns a snapshot mechanism used in connection with a "redo" recovery mechanism. Unfortunately, the conventional snapshot mechanism is inconsistent with a "redo" recovery mechanism that uses the conventional after-image journaling mechanism. The conventional snapshot mechanism writes to non-volatile memory old versions of modified state memory records after every write transaction is committed, which is inconsistent with the "redo" objective of doing flushing of modified state memory records to non-volatile memory only at the checkpoints. Alternatively, the conventional after-image journaling mechanism could be used to log modifications to volatile snapshot records, but this alternative would approximately double the size of the after-image log, and involve additional processing time for logging the modifications to the snapshot records.

In the present invention, snapshot records are stored in volatile memory along with volatile state memory records, and modifications to the volatile state memory records by the transactions are logged to an after-image log in non-volatile memory for recovery of the volatile state memory records. But for recovery of the snapshot records in volatile memory, when any one of the records of volatile state memory is to be written from volatile memory to non-volatile state memory, then the set of volatile snapshots records corresponding to said one of the records of volatile state memory is first written from volatile snapshot memory to non-volatile snapshot memory. This ordering of buffer pool flushing permits recovery of the volatile snapshot records from non-volatile state memory or from modifications in the after-image log.

The following example shows that the ordering of the buffer pool flushing makes it possible to recover the snapshot records. Assume that a transaction updated a volatile state memory record X, causing the old volatile state memory record to be transferred to volatile snapshot memory as snapshot record $X_n$, and then the transaction committed, causing the new state memory record X to be logged in the after-image log. Suppose, on one hand, that the updated volatile state memory record was then flushed to non-volatile state memory (causing the flush of record X to be noted in the after-image log file), without the corresponding volatile snapshot versions of record X first being flushed to non-volatile snapshot memory, and then the system crashed. (The flush, for example, could have been done in response to the buffer pool of volatile memory becoming full, or in response to another process requesting the record X.) In this case, the update to record X is already in non-volatile state memory and the flush of record X would be noted in the after-image log file, so that this update to record X could be obtained from the non-volatile state memory. It would not be possible, however, to recover the snapshot record $X_n$. The snapshot record $X_n$ would not have been flushed to non-volatile snapshot memory, nor would it reside in non-volatile state memory, because any prior version of record X in non-volatile state memory would have been overwritten by the flush of the updated record X to non-volatile state memory. Suppose, on the other hand, that all of the corresponding non-volatile snapshot versions of the record X, including snapshot record $X_n$, were flushed to non-volatile snapshot memory, and then the updated record X was flushed to non-volatile memory, and again the transaction committed, and the system crashed. In this case, all of the corresponding snapshot versions of the record X, including the snapshot record $X_n$, would be found in non-volatile memory.

In the usual case, neither the non-volatile state memory record X nor the snapshot record $X_n$ would have been flushed to volatile memory when the system crash occurred. Suppose in this case that the transaction updated the volatile state memory record X, causing the old volatile state memory record to be recorded in volatile snapshot memory as snapshot record $X_n$, and then the transaction committed, causing the new state memory record X to be logged in the after-image log, and then the system crashed. In this situation, the state memory and the snapshot memory would be restored by re-doing the modifications noted in the after-image log. While reading the after-image log, for example, the state memory record X is restored upon reaching the latest modification X of the memory record X, but the old version of state memory record X in non-volatile state memory is first restored to the snapshot record $X_n$.

BRIEF DESCRIPTION OF THE DRAWINGS

Other objects and advantages of the invention will become apparent upon reading the following detailed description and upon reference to the drawings in which.

Figure 1:
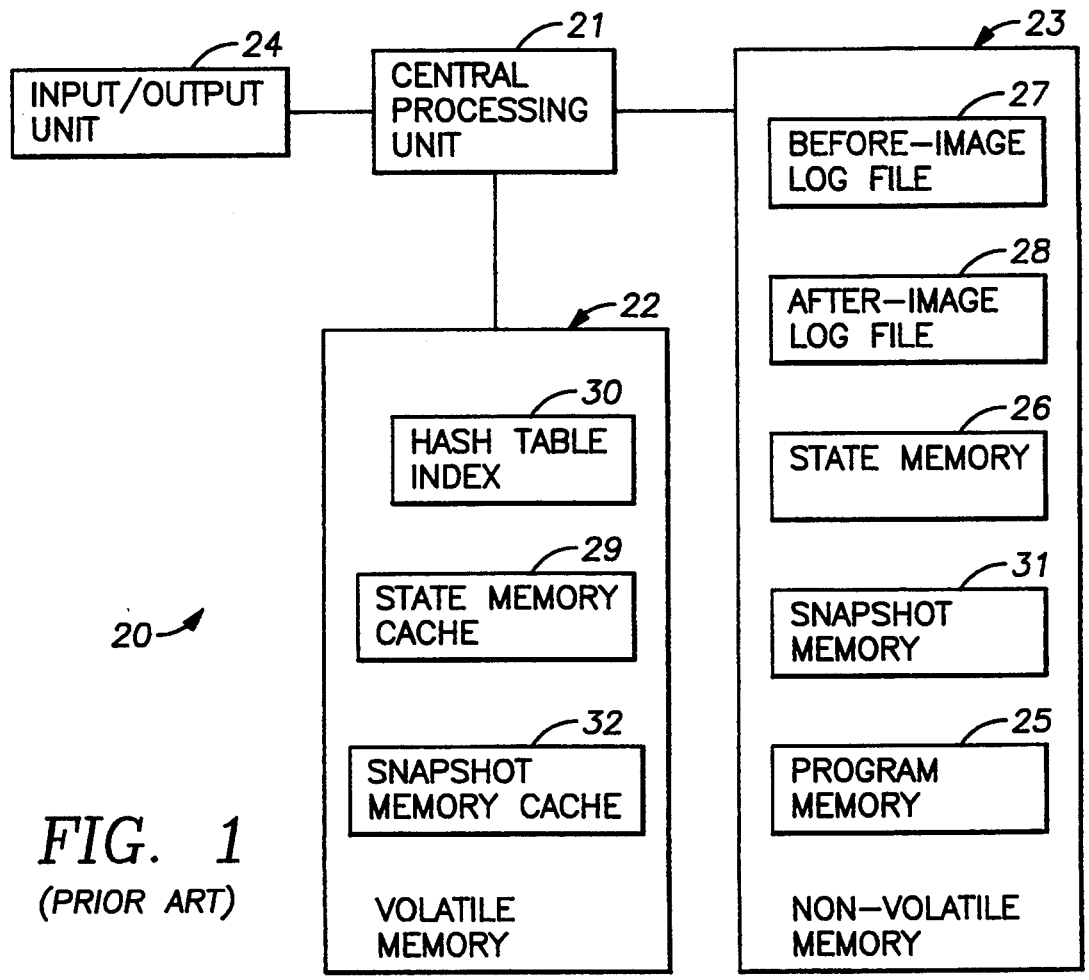
FIG. 1 is a block diagram of a digital computer configured for transaction processing.

While the invention is susceptible to various modifications and alternative forms, a specific embodiment thereof has been shown by way of example in the drawings and will be described in detail herein. It should be understood, however, that it is not intended to limit the invention to the particular form disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Turning now to FIG. 1, there is shown a block diagram generally designated 20 of a digital computer configured for transaction processing. The computer 20 includes a central processing unit 21 for executing programmed instructions; a volatile random access memory 22 for holding instructions or data; a non-volatile memory 23 such as a hard disk drive; and an input/output unit 24. The non-volatile memory 23 includes a program memory 24 in which programs are stored. Typically, the digital computer 20 executes programs which have been transferred from the program memory 25 to the volatile random access memory 22.

A common problem associated with the digital computer 20 is the likelihood that the execution of instructions by the central processing unit will become disrupted due to a hardware failure, software error or power failure. A power failure, for example, will cause the disappearance of data and programs stored in the volatile random access memory 22. The problem of the loss of data in the volatile random access memory 22 due to a power failure can be solved by storing back-up copies of data in the non-volatile memory 23. The back-up copies, however, must be made in such a way that considers the possibility of failure during a write operation to the non-volatile memory 23.

To deal with the problem of possible failure when writing to non-volatile memory, there has been established a method of programming called "transaction processing" which guarantees that a portion of the non-volatile memory (referred to hereinafter as "state memory" 26) will either be unaffected by a transaction or will be properly updated by results of a transaction, in the presence of the failures. Transaction processing is based upon the technique of making a back-up copy (in one of the log files 27, 28) before the results of a transaction are written to state memory.

It is assumed that certain addressable units of data, referred to herein as "records" can be written to and read from the non-volatile memory. In addition, it is assumed that the log files 27, 28 are updated in an "atomic" fashion such that when a write operation of a record to a log file is interrupted by a failure such as a power failure, the log file will be found either in its original state, or in a state having a correct copy of the record properly written into the log file. This condition of atomicity is guaranteed by the operating systems and non-volatile memories of most computers. Moreover, for computers (such as some inexpensive "personal" computers) in which the operating system and non-volatile memory does not guarantee atomicity of write operations to non-volatile memory, it is possible to use a well-known protocol to guarantee atomicity of the write operations. In this protocol, a record is first written to a back-up area of non-volatile memory, next a switch is set in non-volatile memory, then the record is written into the desired location of non-volatile memory, and finally the switch is cleared in non-volatile memory. When recovering from a failure, the switch is read from the non-volatile memory, and when the switch is found to be set, the write operation is re-done by copying the record from the back-up area of non-volatile memory to the desired location of non-volatile memory, and then the switch is cleared in non-volatile memory.

It is also assumed that after a failure, it is possible to find the end of a log file. This could be done by updating an end-of-file pointer in the log file header each time that the log is updated. Preferably, however, the end of the log file is tagged so that it can be found by a quick search, without requiring the log file header to be updated each time that the log is updated. Each bit the log file, for example, is initially set to a logical one, so that the end of the file can be found when a string of logical ones is found during the search.

Whenever a transaction specifies a read of state memory 26, the non-volatile state memory 26 could be read. Unfortunately, conventional non-volatile memories such as hard magnetic discs have a very long access time compared to the access time of conventional volatile memory 22 such as dynamic random-access memory. Therefore, it is conventional to cache copies of state memory records in a state memory cache 29 in the volatile memory 29. The copies of state memory records presently resident in the state memory cache 29 are indexed in a hash table index 30. The use of the hash table index during a memory access operation is further described below with reference to FIGS. 4 and 5.

In the digital computer 20, it is conventional to distribute the processing of transactions in such a way that the performance of a second transaction is begun before the results of a first transaction are committed. The scheduling of operations for the transactions is typically performed by a multi-tasking or multi-processing operating system program that services a transaction queue. In such a system, the transaction at the head of the queue is given priority and is processed unless this transaction at the head of the queue must wait for completion of an input/output operation or a memory access operation to non-volatile memory. In this situation, the transaction having priority may return execution to the operating system, and the operating system will pass execution to the next transaction having priority. Upon completion of the input/output or memory access operation, however, an input/output or memory interrupt will occur, causing execution to be interrupted in favor of an interrupt handler that will return execution to the operating system. The operating system will then transfer execution to transaction at the head of the queue, which was waiting for the completion of the input/output or memory access operation. In this fashion, the resources of the computer 20 are used more effectively. Because multi-tasking and multi-processing operating systems are well known in the art and are available commercially from the major computer manufacturers, the operating system program for the computer 20 will not be described in further detail.

To ensure ease of recovery in the situation where a second transaction is begun before a first transaction commits, the second transaction is usually precluded from reading any results of the first transaction before the first transaction commits. In the computer 20, for example, a transaction places "write locks" on the state memory records that are modified by the transaction, as will be further described below with reference to FIG. 6, and these "write locks" are removed when the transaction is committed, as further described below with reference to FIG. 2.

To ensure consistency of data read by a transaction, the transaction could place "read locks" on any state memory records that are read by the transaction. The use of memory locks, however, inhibits concurrency between transactions, which causes a decrease in transaction processing speed. Therefore, the system 20 uses a known "snapshot" mechanism to eliminate the need for read locks and to prevent blocking of read operations by write locks. The "snapshot" mechanism permits a transaction to read, at any time, a consistent version of any state memory record existing at the time that the transaction begins. As further described below with reference to FIGS. 3 and 4, a consistent version of a specified state memory record is either read from the state memory 26, 29 or from "snapshot" memory 31, 32.

Figure 2:
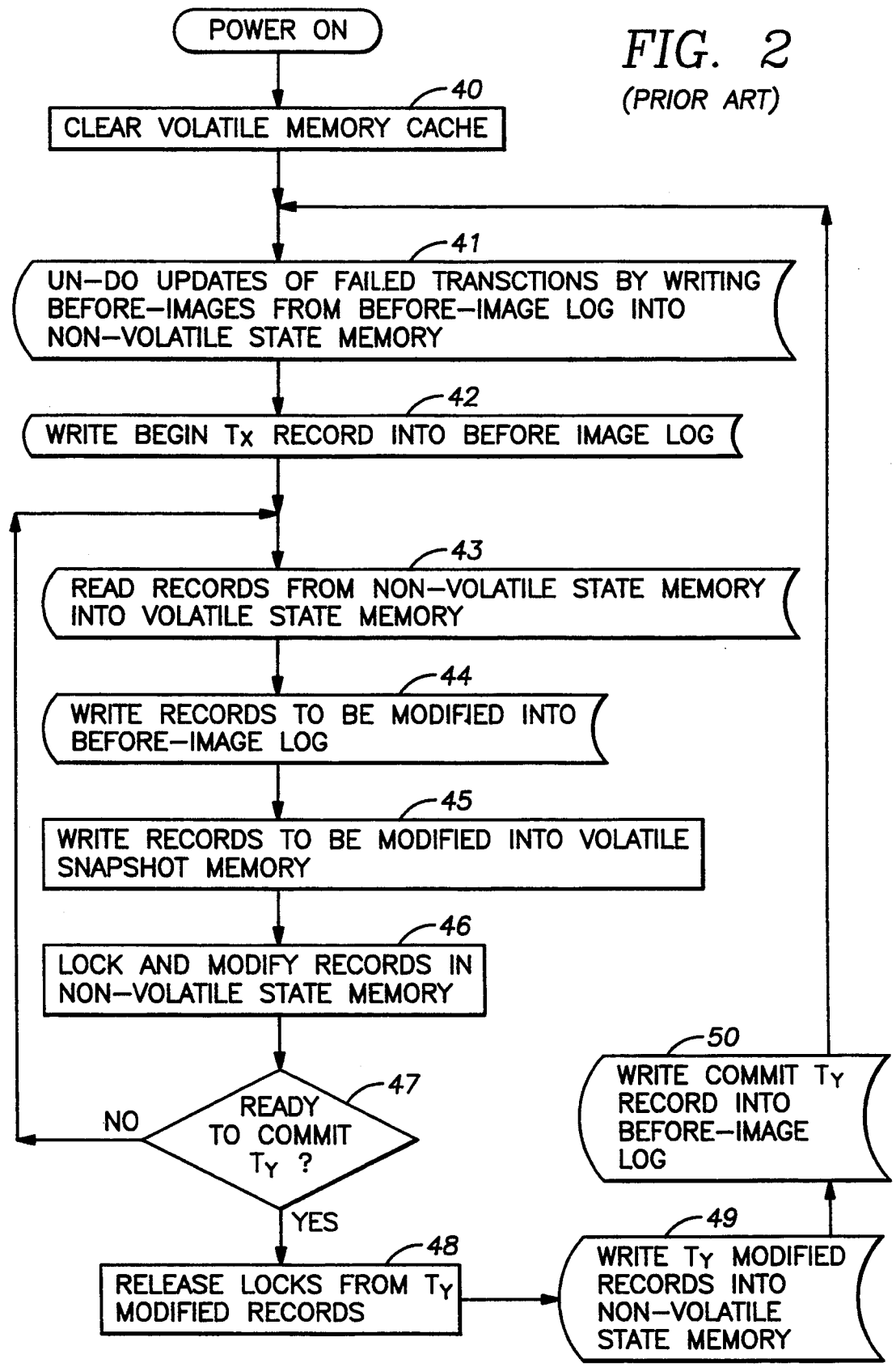
FIG. 2 is a flowchart of a procedure for performing transaction processing in the computer of FIG. 1 and using an "undo" recovery method.

Snapshot memory 31, 32 has been used in known transaction processing systems in combination with an "undo" recovery procedure, which is illustrated by the flowchart in FIG. 2. When the computer (20 in FIG. 1)

is turned on, for example after a power failure, execution by the central processing unit (21 in FIG. 1) begins in the first step 40. In step 40, the state memory cache and the snapshot memory cache are cleared (by clearing a "hash table" index 30 in FIG. 3). Then in step 41, central processing unit 21 reads the before-image log file (27 in FIG. 1) to un-do the updates of failed transactions (i.e., the transactions that had begun but had not yet committed at the time that the failure interrupted the processing of the transactions). In particular, the end of the before-image log file is found, and while reading the before-image log file in reverse chronological order, the before-images of the updated records are copied to the non-volatile state memory (26 in FIG. 2).

It is possible to log the before images of a number of different transactions in the same before-image log file. In this case, for example, the before-images of the updated records are copied to the non-volatile state memory until a "commit" record is found. The commit record, for example, identifies a transaction that committed, and also includes an "active" list of transactions that were uncommitted at that time. This list is saved, and while continuing to read the before-image file in reverse chronological order, only the updates of the uncommitted transactions need be copied to the non-volatile state memory. Moreover, the beginning of a transaction could be logged in the before-image log by a "begin transaction" record. Upon reaching a "begin transaction" record in the before-image log, the transaction for which preparation began is removed from the "active" list, and when the "active" list becomes empty, step 41 is finished.

Preferably, however, a separate before-image file is allocated to each process in a multi-processing system, and the file for each process contains before-images for the currently active transaction of the process. After the transaction commits, its log of before-images is no longer needed, and the before-image log file is truncated for re-use by the next transaction of the process. No "commit record" is needed, because the before-image log file will be empty until the file is re-used by another transaction. This permits the recovery of a single process that fails in a multi-processing system. In this case, the entire before-image log file for the failed process is scanned backwards to recover and un-do the effects of a failed transaction for the failed process. To recover from all interrupted processes in the case of a power failure, the operating system maintains in non-volatile memory a list of active processes. Therefore, upon recovery from a power failure, this list of processes that were active is accessed to find the interrupted processes, and then the before-image log file of each interrupted process is scanned to un-do the effects of each failed transaction.

Once the non-volatile state memory has been restored, transaction processing can resume in step 42. In step 42, a "begin" record for a selected transaction Tx is written into the before-image log. In step 43, records are read from the non-volatile state memory (26 in FIG. 1) and transferred into volatile state memory (29 in FIG. 1). Next, in step 44, records in volatile state memory that are to be modified by the transaction are written to the "before-image" log, and in step 45, the records to be modified are also written into the volatile snapshot memory cache (32 in FIG. 1), as will be further described below with reference to FIG. 4. Next, in step 46, the records are locked and then modified in accordance with results of the transaction. A multi-processing operating system (such as the VMS operating system sold by Digital Equipment Corporation), however, typically provides a "lock manager" which maintains a separate hash index table to a cache of locks. In this case, the cache of locks is indexed in step 43 before a record is fetched, in order to determine whether a record is already locked, and to lock a free record to be updated. Such a lock manager is desirable in multi-processing systems to simplify scheduling.

A number of such modifications may be logged in the after-image log and made in non-volatile memory records, and a number of other transactions may begin, until a transaction Ty is ready to be committed, as found in step 47. Then, in step 48, the locks on the records modified by Ty are released, and in step 49, the records modified by the transaction Ty are written into the non-volatile state memory 28. Finally, in step 50, a "commit Ty" record is written to the before-image log for the case in which a single before-image log is used, or else for the preferred case in which a separate before-image log file is used for each process, the before-image log file for the process of the Ty transaction is truncated. Processing of other transactions continues in step 45.

FIG. 2 was described in terms of a multiplicity of transactions having begun before some of the multiplicity of transactions have committed. In this situation an operating system program time-shares execution among the multiplicity of transactions during the transaction processing steps 43, 44, 45 and 46. In step 46, a transaction places "write locks" on a group of records that must be modified in a consistent fashion, in order to prevent other transactions from also writing to them and to prevent other transactions from reading inconsistent records. Moreover, so that the relatively simple recovery scheme of FIG. 2 will operate in such a distributed transaction environment, the write locks imposed by a transaction are not released until step 48 when the transaction is committed.

To prevent a transaction from stalling when the transaction needs to read data from a record that is write locked in a system using the "undo" recovery scheme of FIG. 2, it is known to use a snapshot recovery mechanism that keeps a sufficient number of versions of "before images" of records in order to guarantee that any transaction can obtain at any time a version of any record existing at the time that processing of the transaction began. These "before images" of records are called "snapshot" records. In particular, just before a record is modified, a "snapshot" of the record is made. It is possible, however, that an earlier "snapshot" of the same record might also exist. Therefore, the snapshot mechanism provides a means for determining, for each transaction, the correct version of a specified record to be read by a transaction. The snapshot mechanism also provides a means for eliminating old snapshots that no longer need to be read by any transaction.

In order to guarantee the serializability of transactions in a distributed environment, each transaction is specified as either a "read-only" transaction or a "read-write" transaction. A "read-only" transaction may read a snapshot record, but a "read-only" transaction may not modify a live record. A "read-write" transaction may not read a snapshot record, but it may read and modify a live record.

Figure 3:
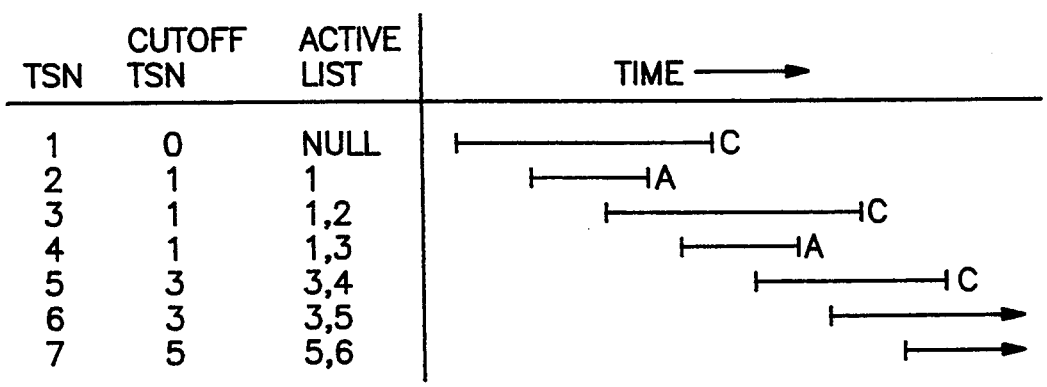
FIG. 3 is a timing diagram that illustrates why snapshots are useful in a transaction processing system.

Turning now to FIG. 3, there is shown a timing diagram for a number of transactions. Each transaction is assigned a transaction sequence number (TSN) when processing of the transaction begins. A transaction sequence number of zero is assigned to the initial state of the state memory.

In order to define an unambiguous record version to be read by any "read-only" transaction, it will be assumed that a "read-only" transaction with TSN=Y performing a read operation upon state memory for a record X will view the results having been last committed to record X at the time that processing of the transaction Y begins. Moreover, it will be assumed that the snapshot mechanism may be called upon at any time during the processing of transaction Y to return this particular version of the record X. This particular version of the record X might exist in either a live record in volatile state memory, a snapshot record in volatile snapshot memory, a live record in non-volatile memory, or a snapshot record in non-volatile memory. It will also be assumed that each unlocked live record and each snapshot record will be tagged with a "record transaction sequence number" indicating the transaction that committed (C in FIG. 3) the version of the record. Moreover, it will be assumed that when a lock is placed on a live record X by a transaction Z, a snapshot copy of the record X is made, a copy of the record is written to the before-image log in order to facilitate the handling of possible aborts, and the locked record may be tagged with the TSN=Z, but if the transaction Z aborts (A in FIG. 3), the before-image copy from the before-image log will be copied back to the live record (which will restore the TSN of the live record to the TSN of the before-image) and the live record will be unlocked.

With these assumptions, it follows that when the read-only transaction TSN=Y is scheduled to begin, a list of the other transactions active at that time should be compiled and assigned to the transaction Y, as illustrated in FIG. 3. The desired version of the record X to be read by the read-only transaction Y is the live record X so long as the live record X has a transaction sequence number that is neither greater than Y nor in transaction Y's active list. Otherwise, the desired record will be found in the most recent snapshot of record X that has a transaction sequence number that is neither greater than Y nor in transaction Y's active list.

With the above assumptions, it follows that it is not necessary to keep any snapshot record having a record transaction sequence number less than a certain "cutoff TSN" which is the transaction sequence number of the earliest active transaction (i.e., the active transaction having the smallest transaction sequence number). Shown in FIG. 3, for example, is the cutoff TSN at the time that each of transactions 1 to 7 begins. For identifying snapshot records to be discarded, it is desirable to determine the cutoff-TSN and assign it to each transaction when each transaction is scheduled to begin. A transaction, for example, may seize the volatile memory space of a snapshot record for re-use whenever the snapshot TSN of the snapshot record is less than the cutoff TSN of the transaction.

Figure 4:
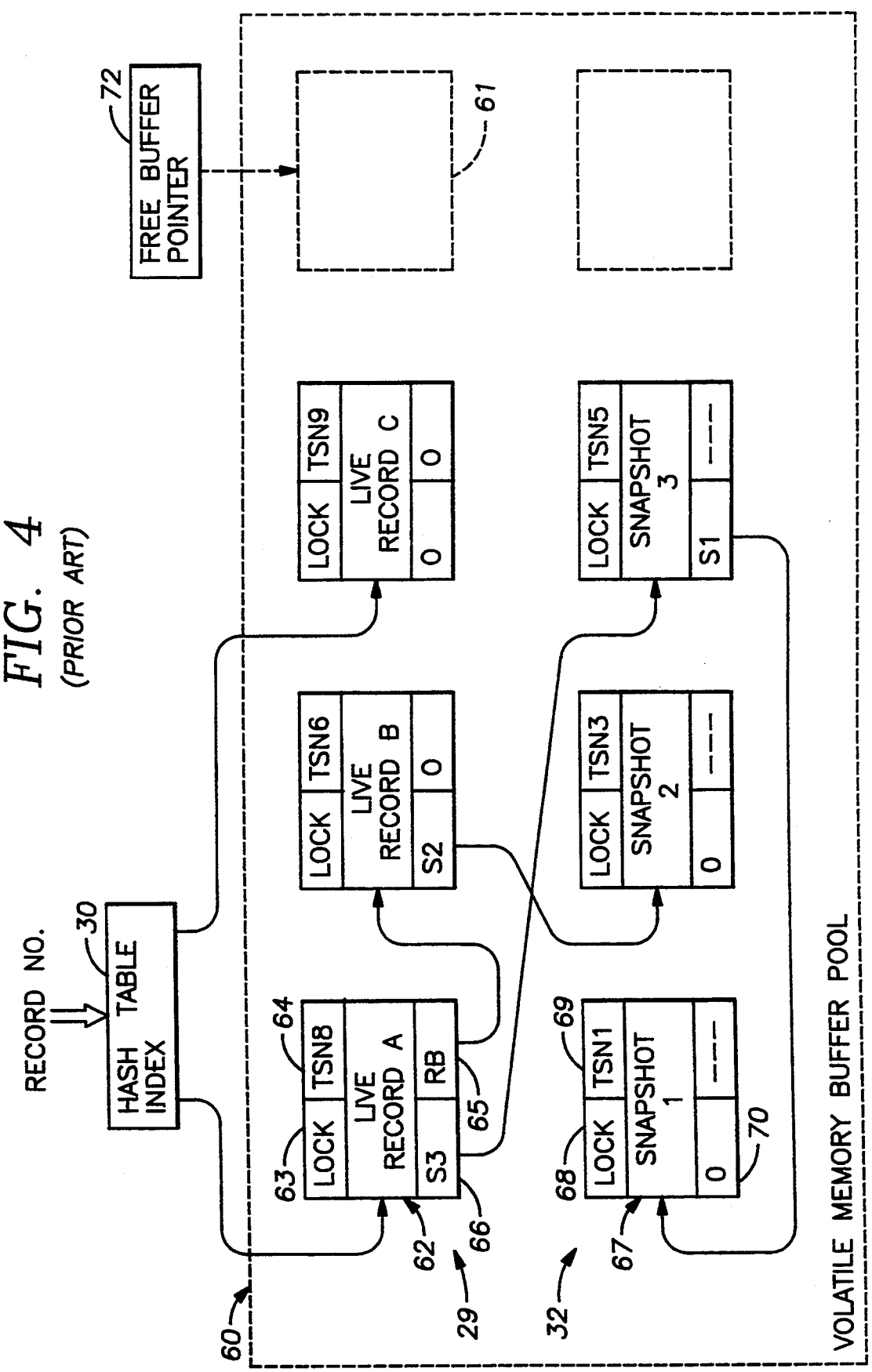
FIG. 4 is a diagram illustrating a data structure using pointers to link volatile state memory records and volatile snapshot records to a hash table to enable a specified record to be found in volatile memory.

Turning now to FIG. 4, there is shown a data structure using pointers to link volatile state memory records in the state memory cache 29 and snapshot records in the snapshot memory cache 32 in such a way that any free buffer such as the free buffer 61 can be used as part of either the state memory cache 29 or the snapshot memory cache 32, and further so that a record can be transferred from the state memory cache 29 to the snapshot memory cache 32, or from the snapshot memory cache 32 to the state memory cache 29, merely by changing pointers.

In the example of FIG. 4, each live record (such as the live record 62) includes a header having a lock flag 63 and a record transaction sequence number 64, and a trailer having a pointer 65 which is zero or points to another live record in the volatile memory buffer pool, and a pointer 66 which is either zero or points to the most recent snapshot of the record. The format of the snapshot records (such as the snapshot record 67) is similar in that it has a lock 68, record transaction sequence number 69, and a pointer 70 which is either zero or points to an earlier snapshot of the record.

To update a specified record X, the hash index table 30 is indexed with the record number X to search for a live version of the record X in the state memory cache. The hash table index 30, however, does not index each and every live record 29 in the state memory cache. In other words, the hash table index 30 is not indexed by the complete record number. Instead, the hash table index is indexed by only a least significant portion of the record number. For any given record number, indexing of the hash table index 30 in this fashion may return either zero, indicating that the desired live record is not in the state memory cache 29, or a pointer that may point to the desired record or may point to a list of live records including the desired live record. As shown in FIG. 4, when addressed with the record number "B" the hash table index returns a pointer to record A, which includes a record pointer RB to the desired record B.

When a read-only transaction desires to read a record, however, further searching may be required to find the proper version of the record. The live record is inspected first, and then the snapshot records are inspected in sequence beginning with the most recent snapshot, until a record is found having a record transaction sequence number that is neither greater than the transaction sequence number of the current transaction nor included in the active list for the current transaction. If a read-only transaction desires to read record B, for example, the transaction sequence number of the live record B (which is TSN6 in this case) is compared to the transaction sequence number of the read-only transaction. If the live record B is not a proper version, then the snapshot pointer (which is S2 in this case) of live record B is inspected to determine whether the snapshot memory cache 32 includes any snapshots of record B. If so, then the record transaction sequence numbers of the snapshots are inspected in the chain of snapshots, until a proper version of record B is found. If a proper version of the record B is not found, then the non-volatile memory 23 must be accessed to find the proper version of the record. In the example of FIG. 4, for example, snapshot 1 is an early snapshot of the live record A, and the snapshot 3 is a later snapshot of the live record A.

Figure 5A:
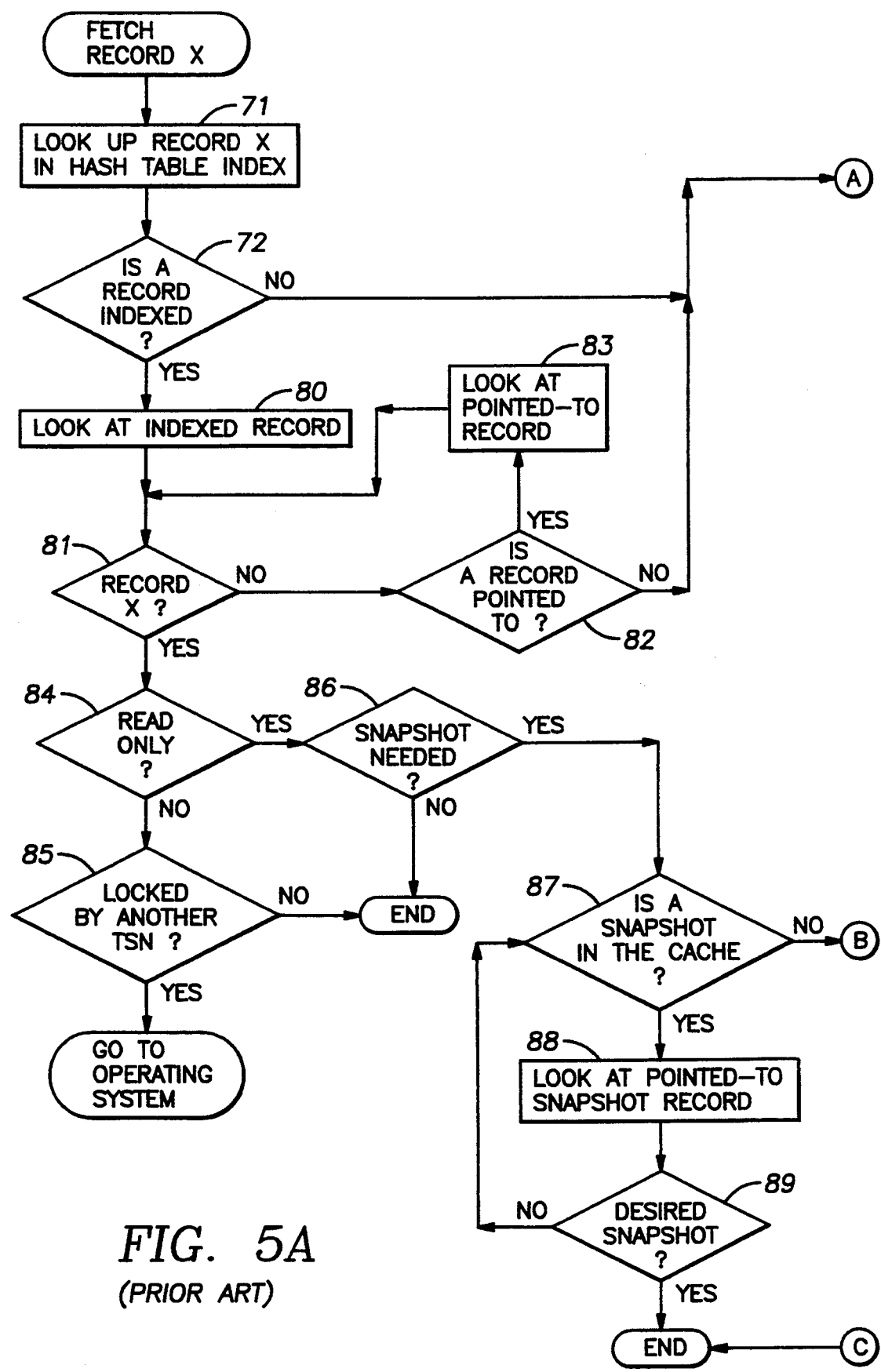
FIGS. 5A and 5B together comprise is a flowchart of a procedure for fetching a desired record using the pointers of the data structure of FIG. 4.
Figure 5B:
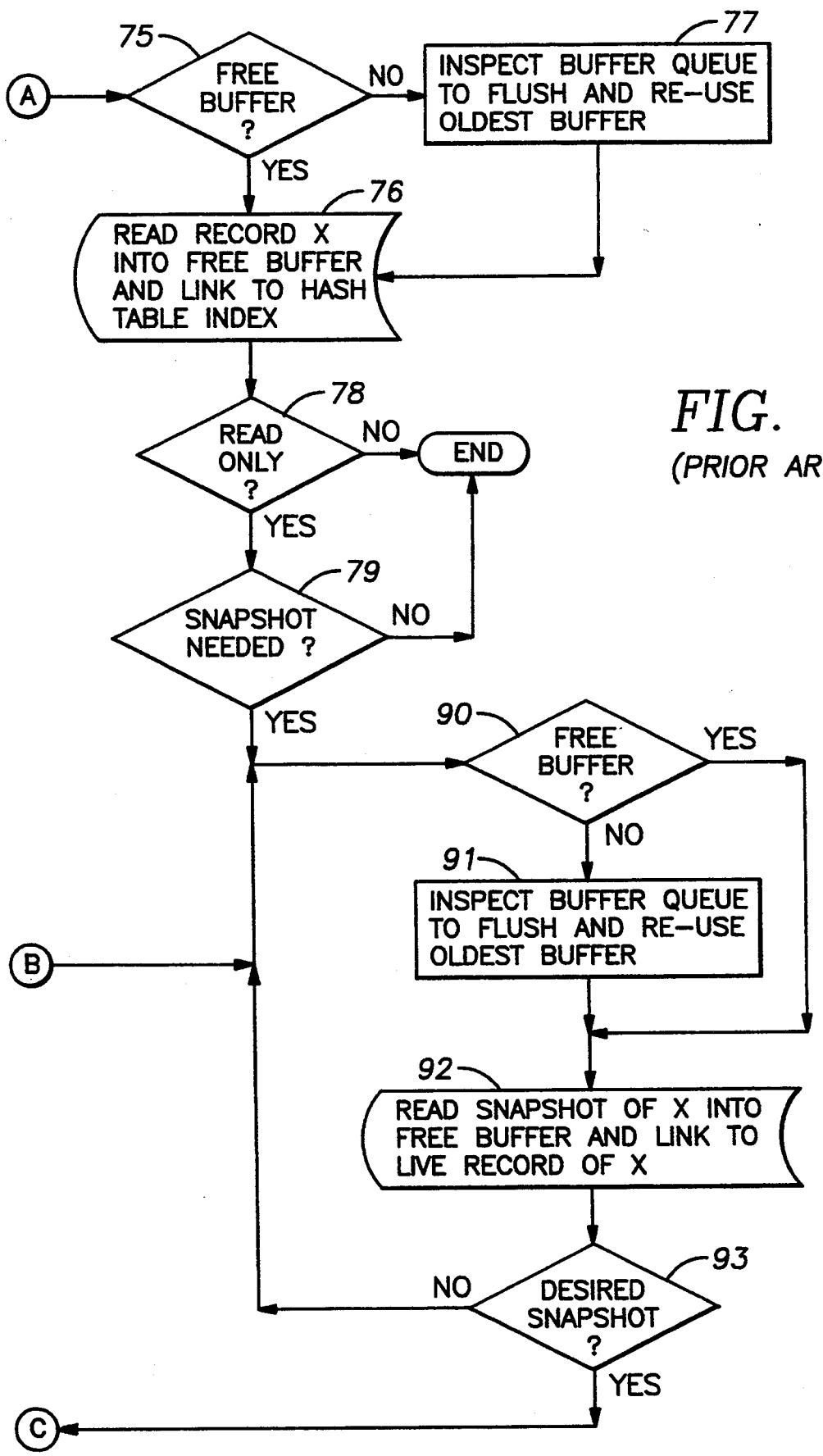

The process for fetching a desired record is illustrated in further detail in the flow chart of FIGS. 5A and 5B. In a first step 71 in FIG. 5A, the hash table index (30 in FIG. 1) is indexed with a least significant portion of the record number. Then in step 72 the indexed entry in the hash table index is inspected to determine, whether it is zero, or a pointer to a buffer in the volatile memory buffer pool (60 in FIG. 4). If the entry is zero, then the desired record is not indexed, and the desired record must be fetched from the non-volatile memory (23 in FIG. 1). Therefore, in step 75 of FIG.

5B, the value of a free buffer pointer (72 in FIG. 4) is compared to the limit of the volatile memory buffer pool (60 in FIG. 4) to determine whether there is a free buffer. If so, then in step 76, the desired record is read from the state memory 26 of the non-volatile memory 23 and written into the free buffer. Moreover, the free buffer is linked to the hash table index. Assuming that the record was not previously indexed, a pointer to the free buffer is placed in the hash index table. Otherwise, if the record was previously indexed, then the free buffer is linked to the chain of indexed records in the state memory cache 29.

If a free buffer was not found in step 75, then in step 77 a list of buffers used by the current process (a buffer queue) is inspected to find the oldest buffer, which is flushed and reused in step 76.

In the prior-art "Rdb DBMS " and "VAX DBMS" systems, for example, a list of records read from non-volatile state memory is kept. When a live record is updated and a snapshot is made, the updated and snapshot records are marked in the list. When each transaction commits, the marked records are flushed to non-volatile memory and the list is cleared.

In step 78, the record read into the free buffer in step 76 is the desired record when the transaction fetching the record X is a "read-write" transaction. If the transaction is a "read only" transaction, however, then in step 79 the record transaction sequence number is inspected to determine whether the live record is a proper version for the read only transaction. A snapshot version is required, for example, if the transaction sequence number of the live record is greater than the transaction sequence number of the transaction, or if the transaction sequence number of the live record is found in the active list for the transaction. If a snapshot is needed, then the most recent snapshot must be fetched from non-volatile snapshot memory. In step 90 the value of the free buffer pointer (72 in FIG. 4) is compared to the limit of the volatile memory buffer pool (60 in FIG. 4) to determine whether there is a free buffer. If so, then in step 92, the most recent snapshot of record X is read from the snapshot memory 31 of the non-volatile memory 23 and written into the free buffer. Moreover, the free buffer is linked to the hash table index via the live record X. If a free buffer was not found in step 90, then in step 91 the buffer queue is inspected to find the oldest buffer, which is flushed and then reused in step 92.

In step 93, the snapshot read from non-volatile memory in step 92 is inspected to determine whether the snapshot is a proper version for the read-only transaction. If not, then execution loops back to step 90 to fetch the next most recent snapshot from the non-volatile snapshot memory, and the process iterates until a proper version is obtained for the "read-only" transaction.

If in step 72 of FIG. 5A it is found that the record is indexed in the hash table index, then in step 80 of FIG. 5A the indexed record is inspected to decide in step 81 whether the indexed record is the desired record. If not, then in step 82 the record pointer area of the record is inspected to see whether the indexed record points to other record. If not, execution branches to step 75 of FIG. 5B to obtain the desired record from non-volatile memory. If the record pointer area includes a pointer to another record, then in step. 83 of FIG. 5A the pointed-to record is inspected and execution loops back to step 81 to search through the entire chain of live records until either the end of the chain is found in step 82 or the desired record is found in step 81.

If the desired record is found in step 81, then in step 84 execution branches depending upon whether the record is needed for a read only operation. If not, then the record can be used so long as it is not locked by another transaction, as tested in step 85. If the record is locked by another transaction, then the current transaction is stalled, and execution branches to the operating system to transfer execution to another transaction, such as the transaction having locked the record.

If step 84 determines that the transaction is a read only transaction, then in step 86 the live record is inspected to determine whether the live version of the record is a proper version. A snapshot version is required, for example, if the transaction sequence number of the live record is greater than the transaction sequence number of the transaction, or if the transaction sequence number of the live record is found in the active list for the transaction. If a snapshot is needed, then in step 87 the snapshot pointer is obtained from the snapshot pointer area of the live record, and the snapshot pointer is used to determine whether a snapshot record is in the snapshot memory cache. If not, then in steps 90 to 93 of FIG. 5B the proper version of the record is read from non-volatile snapshot memory. Otherwise, when a snapshot record is pointed to, then in step 88 of FIG. 5A the pointed-to snapshot record is inspected to determine in step 89 whether it is a proper version of the record. If not, then execution branches back to step 87 of FIG. 5A until either the end of the chain of snapshots is reached and a proper version of the record is read from non-volatile memory in step 92 of FIG. 5B, or the proper version of the record is found in step 89 of FIG. 5A.

Figure 6:
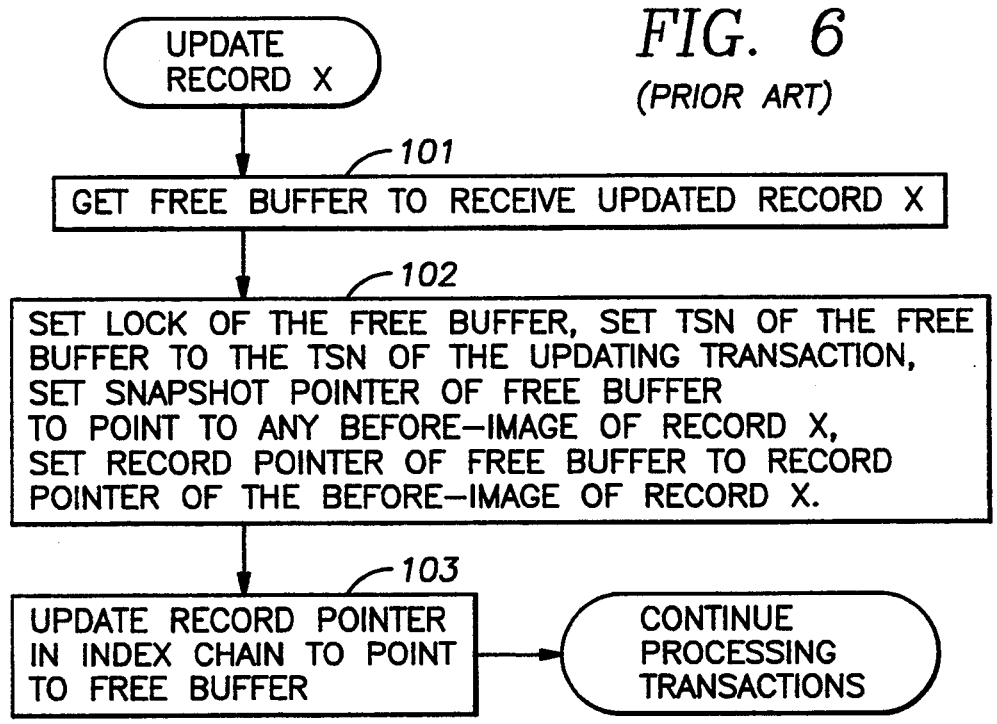
FIG. 6 is a flowchart of a procedure for creating snapshot records from state memory records when the state memory records are updated by a transaction.

Turning now to FIG. 6, there is shown a flow chart of a procedure for updating a record while maintaining the data structure shown in FIG. 4. In the first step 101, a free buffer is obtained to receive the updated record, in the fashion described above for steps 75 and 77 in FIG. 5B. Next in step 102 the lock of the free buffer is set, the transaction sequence number of the free buffer is set to the transaction sequence number of the updating transaction, the snapshot pointer of the free buffer is set to point to the before-image of the record X, and the record pointer of the free buffer is set to the record pointer of the before-image of the record X. Finally, in step 103, a record pointer pointing to the free buffer is inserted in the chain of records from the hash table index 30. The procedure of FIG. 6 is used by a read-write transaction, for example, after an attempt is made to fetch the record using the procedure of FIGS. 5A and 5B, and after finding in step 85 of FIG. 5A that the record X is not locked by another transaction sequence number. In this case, the record fetched by the procedure of FIGS. 5A and 5B is the "before-image" of record X. In other words, in step 103, the pointer to the before-image of record X is changed to point to the updated record.

Figure 7:
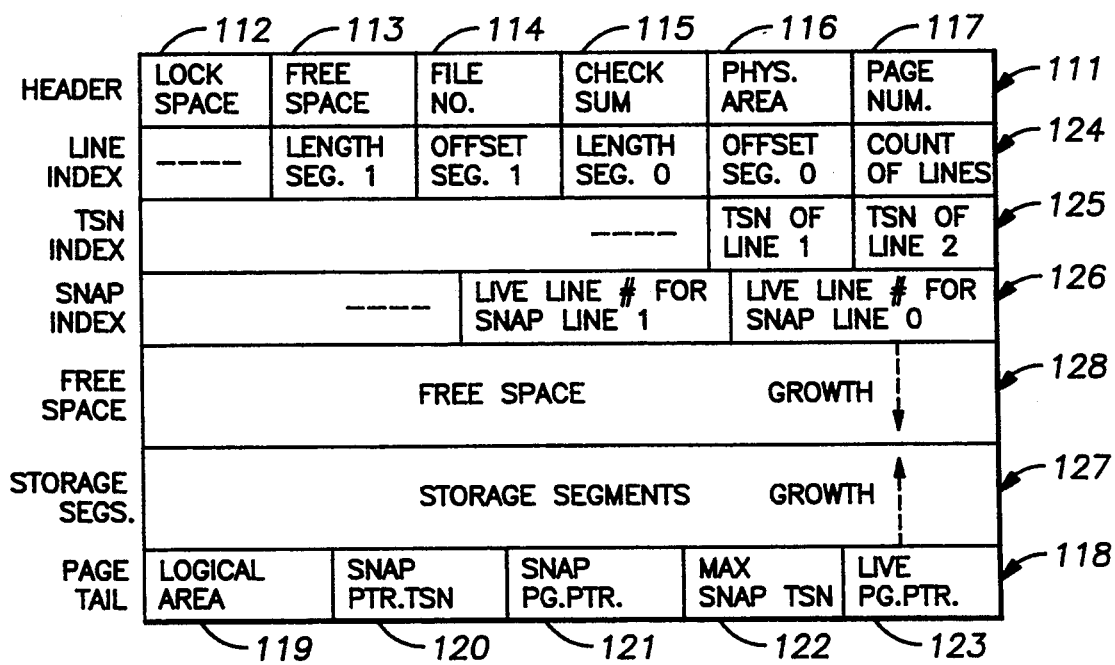
FIG. 7 is a diagram showing the preferred record organization as a page including variable-length segments.

In the example of FIG. 4, it is assumed that the records were of fixed size, and a record transaction sequence number was associated with each record. In the preferred embodiment, however, as well as in prior art systems, it is desirable to use a record organization as shown in FIG. 7 in which pages are chained together as shown in FIG. 4 but a page may include a number of variable length segments, each of which has an associated record transaction sequence number. This specific organization has the advantage that each snapshot page may include a number of different versions of the same segment. As shown in FIG. 7, a snapshot page 110 includes a standard page header 111 having lock space 112, free space 113, a file number 114, a check sum 115, a physical area 116, and a page number 117. When using the record format of FIG. 7, for example, a transaction addresses state memory by the combination of a file number and a page number. The page 110 also includes a trailer or page tail 118 having a logical area 119, a record transaction sequence number of a pointed to snapshot page 120, a snapshot page pointer 121, a maximum record transaction sequence number of the writers to the snapshot page, and a live page pointer 123 pointing to the corresponding live page.

The snapshot page 110 further includes a line index 124 that is a directory to all storage segments on the page. It contains the offset from the top of the page and the length of each storage segment which is on the page. Next the snapshot page 110 includes a transaction sequence number index 125 that identifies the transaction sequence number of the transaction that originally created the version of the record that is now stored on the snapshot page. Moreover, the snapshot page 110 includes a snap index 126 that maps each snapshot line entry with a live page line number. The snap index permits several snapshot versions of one live record to be included on the same snapshot page. In practical terms, the use of the snapshot index assures that in the typical case, there will be one and only one snapshot page for each live page, although in some cases there will be two snapshot pages for each live page, and in less frequent cases more than two snapshot pages for each live page. The remainder of the snapshot page 110 includes storage segments 127 at the bottom of the page and free space 128 in the middle of the page for growth of the indices in a downward direction and a growth of the storage segments in an upward direction.

The snapshot pages 110 have a format similar to live pages. Preferably each snapshot page is stored in a snapshot file that is different from the file in which the corresponding live page is stored. Therefore, the hash table index in this case includes entries for the snapshot pages in the snapshot memory cache that are different from the hash table index entries for the live pages, and the concatenation of the file and page number corresponds to the record number used in FIG. 4 for indexing the hash table index 30. Moreover, when the page format of FIG. 7 is used, the updating of a record proceeds as shown in FIGS. 5A and 5B and in FIG. 6, although instead of using a free buffer to receive an updated page, it is somewhat more efficient to fetch a free buffer and copy the before-image page into the free buffer. The before-image of the page is then locked for updating, and the copy in the free buffer is used as a snapshot copy. In almost every case copying is required because in the usual case a transaction will not update all of the segments on a page.

As described above, the computer 20 processes transactions using an "undo" recovery mechanism that provides very fast recovery because only the effects of failed transactions must be undone. A considerable amount of processing time, however, is spent flushing updated records to non-volatile state memory and updating the non-volatile snapshot memory when each transaction is committed. But in a stable environment where system crashes are very infrequent, fast recovery is not particularly important. For transactions that update the same records for multiple transactions, and transactions that are short and do not update many pages, a considerable fraction of the processing time is wasted by flushing the updated records to state memory at the end of every transaction.

The present invention involves the use of a "redo" recovery mechanism that does not flush updated records to state memory after every transaction. Instead, updated records are written sequentially to an after-image log, and all of the updated records are flushed to state memory only when certain "check points" occur. The check-points occur, for example, after a specified number of transactions are committed, or after a predetermined number of bytes have been written to the after-image log since the last checkpoint. The "redo" recovery mechanism therefore allows updated, committed records to remain in volatile memory. When a system crash occurs, the volatile state memory existing at the end of the last committed transaction is reconstructed by reading from the non-volatile memory the state memory records existing at the time of the last check-point, and re-doing the modifications recorded in the after-image log. The after-image log, for example, is read sequentially while re-doing the modifications.

In the present invention, snapshot records are stored in volatile memory along with volatile state memory records, and modifications to the volatile state memory records by the transactions are logged to an after-image log in non-volatile memory for recovery of the volatile state memory records. Updates to the volatile snapshot records as well as updates to the volatile state memory records are flushed to non-volatile memory at the checkpoints. In addition, flushing of selected records is permitted between the checkpoints, without requiring a flush of all the updated records at that time. Moreover, updates to snapshots need not be logged to the after-image log. These advantages of the invention are achieved by flushing all of the updated snapshots of the selected record to non-volatile memory before the selected state memory record is flushed to non-volatile memory.

The present invention also has the advantage that the conventional state memory and snapshot memory caching facility can be used for maintaining the state memory cache and snapshot memory cache, and a conventional after image journaling facility can be used for maintaining the after-image log. A specific embodiment of the invention using these conventional facilities with the digital computer 20 of FIG. 1 will now be described with reference to FIG. 8.

Figure 8:
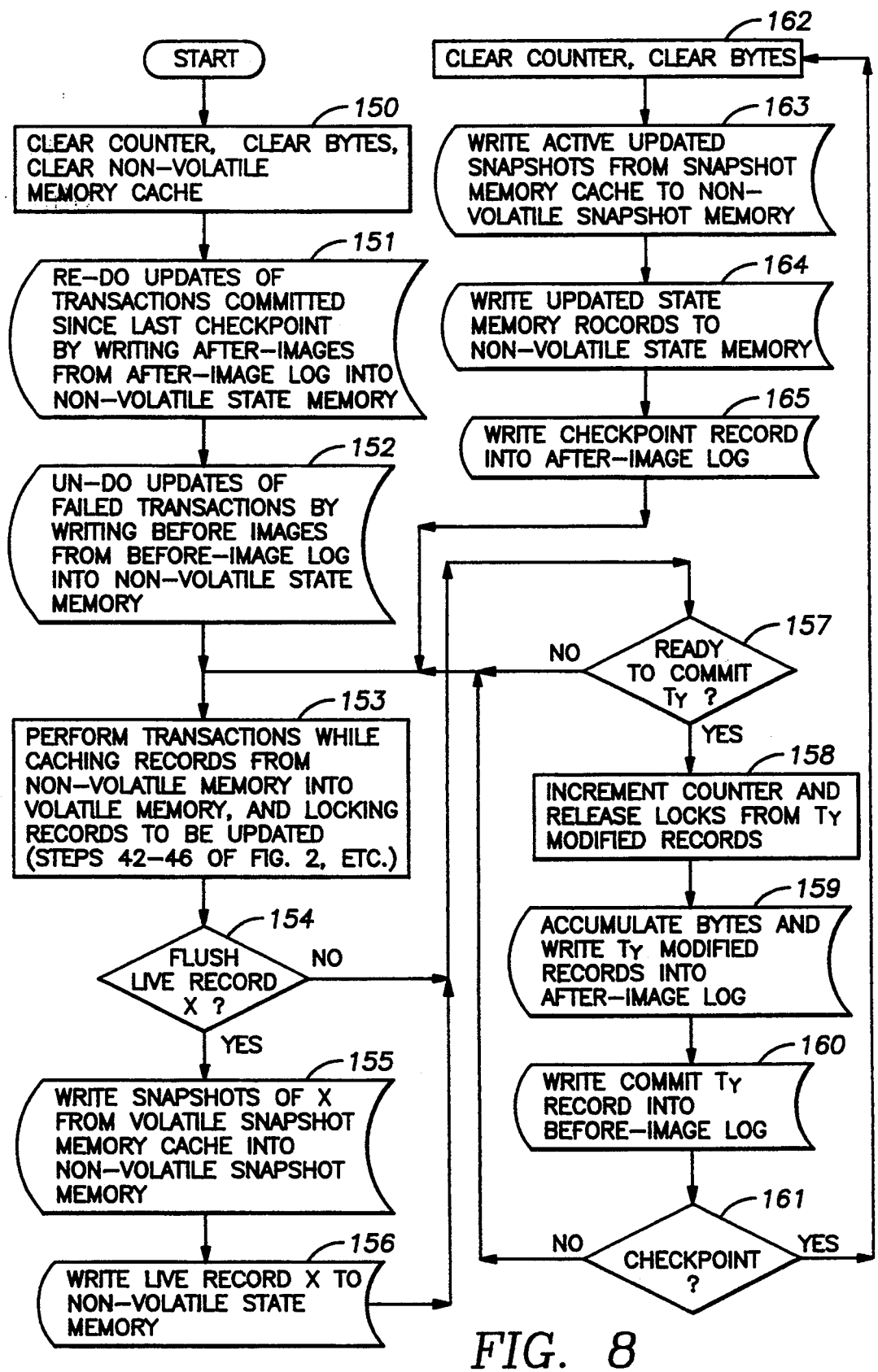
FIG. 8 is a block diagram of an organization of non-volatile memory for the digital computer of FIG. 1 in accordance with a specific embodiment of the present invention.

Turning now to FIG. 8, there is shown a flowchart illustrating the operation of the digital computer (20 in FIG. 1) in accordance with the specific embodiment of the invention. This operation of the digital computer begins in step 150, for example, upon applying power to the computer after a power failure. In step 150 a counter (COUNTER) for counting transactions committed since the last checkpoint is cleared, a variable (BYTES) for accumulating the number of bytes logged to the after-image file is cleared, and the state memory cache (29 in FIG. 1) and the snapshot memory cache (32 in FIG. 1) are cleared by clearing the hash table index (30 in FIG. 4).

Next in step 151 the after-image log is used to "roll forward" the state memory to include the updates in the after-image log following the last checkpoint. This could be done by scanning the after-image log in either a forward or reverse direction, although the conventional after-image journaling facility of "Rdb/VMS" and "VAX DBMS" scans the after-image log in a forward direction, beginning at the last checkpoint. A pointer to the last checkpoint, for example, is read from a header record of the after-image log, or preferably from a "root file" or system catalog in the non-volatile memory.

In step 152, the before-image log is scanned to un-do the effects of failed transactions by writing before images from the before-image log into the non-volatile memory, as was described above with reference to 41 of FIG. 2.

Processing of transactions is resumed in step 153 (under the control of the operating system) while caching records from non-volatile memory into volatile memory, and locking records to be updated, as described above with reference to steps 42 to 46 of FIG. 2 and with respect to FIGS. 5A and 5B and 6.

In accordance with an aspect of the present invention, however, selected live records are flushed to non-volatile state memory between checkpoints at which all of the updated records are flushed to non-volatile memory. A selected live record is flushed to non-volatile state memory, for example, to provide a free buffer in the buffer pool, corresponding to steps 77 and 91 in FIG. 5B. A selected state memory record may also be flushed to non-volatile memory in order to insure data consistency in multi-processing or multi-processor systems when another process desires to access the selected record.

When a selected (unlocked) live record is to be flushed to state memory, as determined in step 154, then in step 156 the routine of FIG. 10 is used to flush the volatile live record to non-volatile state memory. In accordance with an important aspect of the invention, this flush involves first flushing in step 155 all of the active snapshots of the live records from volatile snapshot memory to non-volatile snapshot memory before flushing the volatile live record to non-volatile state memory.

In step 157, execution branches to step 167 when a transaction Ty is ready to commit. Each transaction, for example, is a program that includes a "COMMIT" or end statement which causes execution to transfer to step 158. In step 158, the transaction Ty is committed by incrementing the counter (COUNTER) and releasing the locks from its updated records, and then in step 159 by increasing the number of bytes (BYTES) by the number of bytes in its updated records and writing its updated records to the after-image log file. Next, in step 160, a "commit Ty" record is written to the before-image log for the case in which a single before image log file is used, or else for the preferred case in which a separate before-image log file is used for each process, the before-image log file for the process of the Ty transaction is truncated. Finally, in step 161, execution branches depending on whether a checkpoint is reached. For this purpose, the number of transactions committed in steps 158 to 160 since the last checkpoint (COUNTER) is compared to a predetermined limit value, and also the number of bytes (BYTES) logged in the after-image log file is also compared to a predetermined limit value. When neither of the limit values is exceeded, execution branches to step 153 to continue processing transactions; otherwise, execution branches to step 162 to begin a checkpoint flush. In accordance with the invention, the snapshot records are flushed before their respective live records are flushed.

In step 162, the counter (COUNTER) and byte accumulator (BYTES) are cleared. Then in step 163, the active snapshot records in the snapshot memory cache updated since the last checkpoint are written to non-volatile snapshot memory. (A snapshot record is active if its record transaction sequence number is greater or equal to the cutoff transaction sequence number of the current transaction.) Then in step 164, the updated state memory cache records are written to non-volatile state memory. Finally, in step 165, a checkpoint record is logged in the after-image log, and the location of the checkpoint record is also written in the header of the after-image log or into the "root file."

As described above, it was assumed that the log files were updated using atomic write operations. It should be noted that an atomic operation is needed for doing a write of the updates in cache memory at a checkpoint in step 163 in FIG. 8 only in a system where the after-image log includes the changes (such as segments) to only portions of the records that are written to cache memory in step 163. In this case only the changed portions, and not necessarily the unchanged portions, can be reconstructed in step 151, unless the reconstruction starts from uncorrupted copies of complete records. In any event, an atomic write is not required in steps 155 or 162 for flushing snapshot records to the non-volatile snapshot memory. For most computer systems, however, these considerations are inconsequential because for most computers individual records are always written atomically to non-volatile memory.

In view of the above, there has been described a technique of "re-do" logging that performs flushes of updated state records to non-volatile state memory at predetermined checkpoints and that also recovers snapshot records in non-volatile memory without requiring the snapshot records to be logged in an after-image log. Instead, the recovery of snapshot records is assured by writing the active updated snapshots of an updated state record to non-volatile memory before the updated state record is flushed to non-volatile memory. Because all active snapshots are recovered, the processing of distributed transactions is easily resumed after updates in an after-image log are re-done from the last checkpoint in the log. This recovery of snapshots is particularly advantageous in a multi-processing environment in which only one of many processes might fail. In this situation, the failure of one process is detected and the recovery process of steps 151 and 152 of FIG. 8 is performed to recover the transactions of the failed process. Therefore, the other processes are unaffected by the process that failed.

What is claimed is:

1. A method of operating a digital computer to process transactions, said method comprising the steps of:
   a) reading state records from non-volatile state memory and writing the state records into a volatile state memory cache;
   b) making snapshot copies in a volatile snapshot memory cache of selected state records in the volatile state memory cache, maintaining a corresponding set of said snapshot copies in the volatile snapshot memory cache of each selected state record in the volatile state memory cache, making modifications to the selected state records in the volatile state memory cache, said modifications being specified by said transactions, and committing said modifications to an after-image log in a non-volatile memory; and then c) reading the snapshot copies from the volatile snapshot memory cache and writing the snapshot copies into a non-volatile snapshot memory, and reading the selected state records from the volatile state memory cache and writing the selected state records into the non-volatile state memory, wherein the corresponding set of snapshot copies of each selected state record are read from the volatile snapshot memory cache and written into the non-volatile snapshot memory before said each selected state record is read from the volatile state memory cache and written into the non-volatile state memory.

2. The method as claimed in claim 1, wherein steps b) and c) are repeated sequentially, and step c) is performed after the modifications specified by a predetermined multiplicity of transactions are committed in step b).

3. The method as claimed in claim 1, wherein steps b) and c) are repeated sequentially, and step c) is performed in response to an amount of memory space in the after-image log being taken up by the committed modifications.

4. The method as claimed in claim 1, wherein the reading and writing of a particular one of the selected state records from the volatile state memory cache and into the non-volatile state memory is performed to provide volatile memory space into which another state memory record is written after said another state memory record is read from the non-volatile state memory.

5. The method as claimed in claim 1, further comprising the step of recovering from a failure that disrupts the volatile state memory cache and the volatile snapshot memory cache, wherein said step of recovering from the failure includes performing the modifications committed to the after-image log upon state records read from the non-volatile state memory, and then resuming processing of transactions.

6. The method as claimed in claim 5, wherein the resuming processing of transactions includes reading from the non-volatile snapshot memory snapshot copies having been written into the non-volatile snapshot memory prior to the failure.

7. The method as claimed in claim 1, wherein the maintaining of a corresponding set of said snapshot copies in the volatile snapshot memory cache of each selected state record in the volatile state memory cache is performed by maintaining a linked list of snapshot copies included in the corresponding set, the linked list being linked to said each selected state record in the volatile state memory.

8. The method as claimed in claim 1, further comprising the step of searching for a proper version of a specified record for processing by a specified one of said transactions, said proper version being either a state record fetched from either said state memory cache in said volatile memory or said state memory in said non-volatile memory, or a snapshot record fetched from either said snapshot memory cache in said volatile memory or said snapshot memory in said non-volatile memory.

9. The method as claimed in claim 1, wherein the making of snapshot copies is performed by changing pointers to transfer buffers holding state records from the volatile state memory cache to the volatile snapshot memory cache, and allocating free buffers to the volatile state memory cache to receive modified versions of the state records.

10. The method as claimed in claim 1, wherein the making of snapshot copies is performed by allocating free buffers to the volatile snapshot memory cache, and copying state memory records into the free buffers allocated to the volatile snapshot memory cache.

11. A method of operating a digital computer to process transactions, said method comprising the steps of:
 a) reading state records from a non-volatile state memory and writing the state records into a volatile state memory cache;
 b) making snapshot copies in a volatile snapshot memory cache of selected state records in the volatile state memory cache; maintaining a corresponding set of said snapshot copies in the volatile snapshot memory cache of each selected state record in the volatile state memory cache; searching the volatile state memory cache and the snapshot memory cache for proper versions of specified state records for processing by specified ones of said transactions, each proper version being either a state record fetched from either said state memory cache in said volatile memory or said state memory in said non-volatile memory, or a snapshot record fetched from either said snapshot memory cache in said volatile memory or said snapshot memory in said non-volatile memory; making modifications to the selected state records in the volatile state memory cache, said modifications being specified by said transactions; and committing said modifications to an after-image log in a non-volatile memory, wherein the modifications specified by a plurality of said transactions are made before the modifications of some of said plurality of transactions are committed; and then
 c) reading the snapshot copies from the volatile snapshot memory cache and writing the snapshot copies into a non-volatile snapshot memory, and reading the selected state records from the volatile state memory cache and writing the selected state records into the non-volatile state memory, wherein the corresponding set of snapshot copies of each selected state record are read from the volatile snapshot memory cache and written into the non-volatile snapshot memory before said each selected state record is read from the volatile state memory cache and written into the non-volatile state memory; and then
 d) recovering from a failure that disrupts the volatile state memory cache and the volatile snapshot memory cache, wherein said recovering from the failure includes performing the modifications committed to the after-image log upon state records read from the non-volatile state memory, and then resuming processing of transactions, wherein the resuming processing of transactions includes reading from the non-volatile snapshot memory snapshot copies having been written into the non-volatile snapshot memory prior to the failure.

12. The method as claimed in claim 11, wherein steps b) and c) are repeated sequentially, and step c) is performed after the modifications specified by a predetermined multiplicity of transactions are committed in step b).

13. The method as claimed in claim 11, wherein steps b) and c) are repeated sequentially, and step c) is performed in response to an amount of memory space in the after-image log being taken up by the committed modifications.

14. The method as claimed in claim 11, wherein the reading and writing of a particular one of the selected state records from the volatile state memory cache and into the non-volatile state memory is performed to provide volatile memory space into which another state memory record is written after said another state memory record is read from the non-volatile state memory.

15. A transaction processing system for processing transactions, said transaction processing system comprising, in combination:
 a volatile memory (22);
 a non-volatile memory (23); and
 a central processing unit (21) coupled to said non-volatile memory and said volatile memory for reading records from said non-volatile memory and writing records to said volatile memory, and for reading records from said volatile memory and writing record to said non-volatile memory, said central processing unit being programmed with a program (25) for transaction processing, the programmed central processing unit including:
  means (71-93) for fetching specified records for processing by a selected transaction, wherein said means for fetching fetches each specified record from said volatile memory when said specified record is in said volatile memory, and otherwise fetches said each specified record from said non-volatile memory and stores said each specified record in said volatile memory, and wherein said means for fetching fetches a proper version of said each specified record for said transaction, said proper version being either a state record fetched from either a state memory cache (29) in said volatile memory or a state memory (26) in said non-volatile memory, or a snapshot record fetched from either a snapshot memory cache (32) in said volatile memory or a snapshot memory (31) in said non-volatile memory;
  means (101, 102, 103) for making snapshot copies in said snapshot memory cache of selected state records in the volatile state memory cache so that each selected state record in the state memory cache has a corresponding set of snapshot copies in the snapshot memory cache;
  means (153) for making modifications to the selected state records in the state memory cache, said modifications being specified by said transactions;
  means (159, 160) for committing said modifications to an after-image log (28) in said non-volatile memory; and
  cache flushing means (163, 164) for reading the snapshot copies from the snapshot memory cache and writing the snapshot copies into the snapshot memory in the non-volatile memory, and reading the selected state records from the state memory cache and writing the selected state records into the state memory in the non-volatile memory, wherein the corresponding set of snapshot copies of each selected state record are read from the snapshot memory cache and the corresponding set of snapshot copies of each selected state record are written into the snapshot memory in the non-volatile memory before said each selected state record is read from the state memory cache and written into the state memory in the non-volatile memory.

* * * * *